(12) United States Patent
Qi

(10) Patent No.: US 10,664,516 B2
(45) Date of Patent: May 26, 2020

(54) SEARCH SYSTEM, METHOD AND APPARATUS

(71) Applicant: BAIDU ONLINE NETWORK TECHNOLOGY (BEIJING) CO., LTD., Beijing (CN)

(72) Inventor: Hui Qi, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 605 days.

(21) Appl. No.: 15/393,695

(22) Filed: Dec. 29, 2016

(65) Prior Publication Data
US 2018/0089230 A1 Mar. 29, 2018

(30) Foreign Application Priority Data
Sep. 29, 2016 (CN) .......................... 2016 1 0868419

(51) Int. Cl.
| | |
|---|---|
| G06F 16/9535 | (2019.01) |
| G06F 16/58 | (2019.01) |
| G06F 16/532 | (2019.01) |
| G06F 3/0481 | (2013.01) |
| G06F 3/0484 | (2013.01) |

(52) U.S. Cl.
CPC ........ G06F 16/5866 (2019.01); G06F 3/0481 (2013.01); G06F 3/04842 (2013.01); G06F 16/532 (2019.01); G06F 16/9535 (2019.01)

(58) Field of Classification Search
CPC .......... G06F 16/2428; G06F 16/90328; G06F 16/3328; G06F 16/432
See application file for complete search history.

(56) References Cited

U.S. PATENT DOCUMENTS

| | | | |
|---|---|---|---|
| 8,782,077 B1* | 7/2014 | Rowley | G06F 16/5838 |
| | | | 707/769 |
| 2008/0162540 A1* | 7/2008 | Parikh | G06F 16/9535 |
| 2009/0049100 A1* | 2/2009 | Wissner-Gross | G06F 16/332 |

FOREIGN PATENT DOCUMENTS

CN 104408099 3/2015

* cited by examiner

*Primary Examiner* — Cheyne D Ly
(74) *Attorney, Agent, or Firm* — Lathrop GPM LLP

(57) ABSTRACT

Disclosed is a search system, method and apparatus. A click operation in a search frame is detected. In response to a click operation is detected, a control corresponding to the click operation is determined, the control comprising a text input control and an image input control that are preset in the search frame. The clicked control in the search frame according to the control corresponding to the click operation is enabled, and an unclicked control is concealed. Information for search through the enabled control is received, the information for search comprises a text for search or an image for search. The received information for search is sent to a server, so that the server carries out searching based on the information for search, to obtain an image search result.

10 Claims, 8 Drawing Sheets

SEARCH SYSTEM, METHOD AND APPARATUS

CROSS-REFERENCE TO RELATED APPLICATION

This application claims the priority of Chinese Patent Application No. 201610868419.8, entitled "Search System, Method and Apparatus," filed on Sep. 29, 2016, the content of which is incorporated herein by reference in its entirety.

TECHNICAL FIELD

The present application relates to the field of computer technology, in particular, to the field of Internet technology, and more particularly, to a search system, method and apparatus.

BACKGROUND

Searches in the computer field generally refer to searches for texts or images. In an existing search method, a text input control and an image input control may be set in a search frame of a search interface, to simultaneously receive texts or images entered by users.

However, in an existing information push manner, text-image mixed searching and mixed sorting are generally carried out using a text and an image input by a user, and what is presented to the user is also a text-image mixed search result. The text-image mixed searching and mixed presentation result in low search efficiency. Therefore, there exists a problem of low search efficiency.

SUMMARY

An objective of the present application is to provide an improved search system, method and apparatus, to solve the problem mentioned in the Background.

In the first aspect, the present application provides a search system, the system comprising: a terminal and a server; wherein the terminal is configured to detect a click operation in a search frame; determine, in response to a click operation being detected, a control corresponding to the click operation, wherein the control comprises a text input control and an image input control that are preset in the search frame, the text input control is used for receiving a text for search, and the image input control is used for receiving an image for search; enable the clicked control in the search frame according to the control corresponding to the click operation, and conceal an unclicked control; receive information for search through the enabled control, wherein the information for search comprises a text for search or an image for search; and send the received information for search to the server, so that the server carries out searching according to the information for search, to obtain an image search result; and the server is configured to receive the information for search sent by the terminal, and carry out searching according to the received information for search, to obtain the image search result.

In the second aspect, the present application provides a search method, the method comprising: detecting a click operation in a search frame; determining, in response to a click operation being detected, a control corresponding to the click operation, wherein the control comprises a text input control and an image input control that are preset in the search frame, the text input control is used for receiving a text for search, and the image input control is used for receiving an image for search; enabling the clicked control in the search frame according to the control corresponding to the click operation, and concealing an unclicked control; receiving information for search through the enabled control, wherein the information for search comprises a text for search or an image for search; and sending the received information for search to a server, so that the server carries out searching according to the information for search, to obtain an image search result.

In the third aspect, the present application provides a search apparatus, the apparatus comprising: a detection unit, configured to detect a click operation in a search frame; a control determination unit, configured to determine, in response to a click operation being detected, a control corresponding to the click operation, wherein the control comprises a text input control and an image input control that are preset in the search frame, the text input control is used for receiving a text for search, and the image input control is used for receiving an image for search; a control enabling unit, configured to enable the clicked control in the search frame according to the control corresponding to the click operation, and conceal an unclicked control; a receiving unit, configured to receive information for search through the enabled control, wherein the information for search comprises a text for search or an image for search; and a sending unit, configured to send the received information for search to a server, so that the server carries out searching according to the information for search, to obtain an image search result.

By specifying information for search to be a text or an image, the search system, method and apparatus provided in the present application can reduce operations for cross matching of two different pieces of information for search, shorten an operation time, and improve search efficiency.

BRIEF DESCRIPTION OF THE DRAWINGS

After reading detailed descriptions of non-limiting embodiments with reference to the following accompanying drawings, other characteristics, objectives and advantages of the present application will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
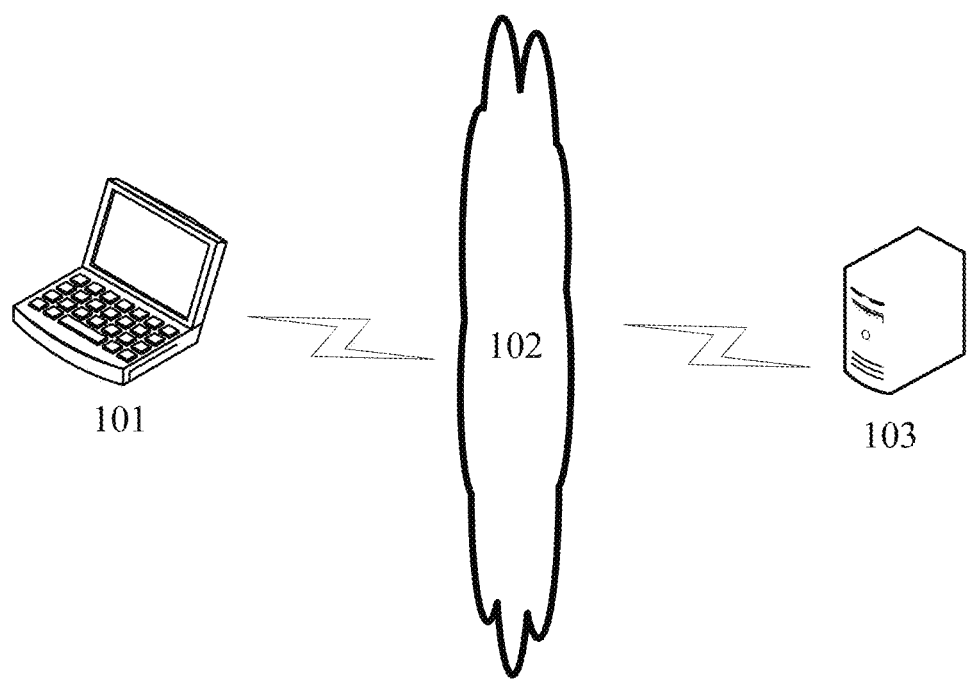
FIG. 1 is a system architecture diagram of an embodiment of a search system according to the present application.

FIG. 1 shows an exemplary system architecture 100 to which an embodiment of a search method or search apparatus of the present application can be applied.

As shown in FIG. 1, the system architecture 100 may include a terminal 101 and a server 103. In some implementations, the system architecture may further include a network 102, and the network 102 is used for providing a medium of a communication link between the terminal 101 and the server 103. The network 102 may include various connection types, for example, a wired or wireless communication link, an optical fiber cable.

A user may use the terminal 101 to interact with the server 103 through the network 102, so as to receive or send information, or the like. The terminal 101 may be installed with various communications client applications, such as a search application, a webpage browser application, a shopping application, an instant messaging tool, an email client, and social platform software.

The terminal 101 may be various electronic devices that have a display conceal and support webpage browsing, which include but are not limited to a smart phone, a tablet computer, an e-reader, a Moving Image Experts Group Audio Layer III (MP3) player, a Moving Image Experts Group Audio Layer IV (MP4) player, a laptop portable computer, a desktop computer, and the like.

The above terminal is configured to detect a click operation in a search frame; determine, in response to a click operation being detected, a control corresponding to the click operation, where the control includes a text input control and an image input control that are preset in the search frame, the text input control is used for receiving a text for search, and the image input control is used for receiving an image for search; enable the clicked control in the search frame according to the control corresponding to the click operation, and conceal an unclicked control; receive information for search through the enabled control, where the information for search includes a text for search or an image for search; and send the received information for search to the server, so that the server carries out searching according to the information for search, to obtain an image search result.

In some alternative implementations of this embodiment, the terminal is further configured to: enable the text input control and conceal the image input control, in response to the control corresponding to the click operation being the text input control; and enable the image input control and conceal the text input control, in response to the control corresponding to the click operation being the image input control.

In some alternative implementations of this embodiment, the terminal is further configured to: determine whether the received information for search is a text, in response to the enabled control being the text input control; and if no, send first alarm information; and determine whether the received information for search is an image, in response to the enabled control being the image input control; and if no, send second alarm information.

In some alternative implementations of this embodiment, an image receiving window is displayed in response to the image input control being enabled; an uploaded image is received in response to an image uploading operation in the image receiving window being detected; a thumbnail of the uploaded image is generated; and the generated thumbnail is displayed in the image receiving window.

The server 105 may be a server providing various services, for example, a server that supports the search application on the terminal 101. The server receives information for search sent by the terminal, carries out searching according to the received information for search, to obtain an image search result, and feeds back the image search result to the terminal.

The server is further configured to: match, in response to the received search information being a text for search, the text for search with text characteristics of image information in a prestored image information set, where the image information in the image information set includes images, text characteristics corresponding to the images, and pictorial image characteristics corresponding to the images; determine a predetermined number of text characteristics matching the text for search; and send an image, corresponding to the text characteristics obtained through matching, to the terminal as the image search result.

In this embodiment, the server only receives a text for search or an image for search, and the image information in the prestored image information set includes images, text characteristics corresponding to the images, and pictorial image characteristics corresponding to the images; a time for text-image cross matching during searching can be reduced, thus improving image search efficiency.

In this embodiment, a text characteristic may be a related description for an image, for example, the text characteristic may be a description about shape and color of a pictorial image in the image, and may be a description about a class to which the pictorial image in the image belongs. A pictorial image characteristic may be a characteristic obtained by performing characteristic extraction on a pictorial image in an image, as for how to parse the image to extract the pictorial image characteristic in the image is well known to those skilled in the art, and details are not described herein.

In this embodiment, as for how to match the text for search with text characteristics in the image information and determine a predetermine number of text characteristics matching the text for search, there are multiple implementations in the prior art, and details are not described herein.

The server is further configured to: match, in response to the received search information being an image for search, the image for search with pictorial image characteristics of image information in a preset image information set, where the image information in the image information set includes images, text characteristics corresponding to the images, and pictorial image characteristics corresponding to the images; determine a predetermined number of pictorial image characteristics corresponding to the image for search; and send an image, corresponding to the pictorial image characteristics obtained through matching, to the terminal as the image search result.

In this embodiment, as for how to match the image for search with pictorial image characteristics in the image information and determine a predetermine number of pictorial image characteristics matching the image for search, there are multiple implementations in the prior art, and details are not described herein.

It should be understood that the numbers of terminals, networks, and servers in FIG. 1 are only schematic. According to an actual requirement, there may be any numbers of terminals, networks, and servers.

It should be noted that, for a related description about the steps performed by the terminal or server in this embodiment, reference may be made to the introduction in other embodiments.

Figure 2:
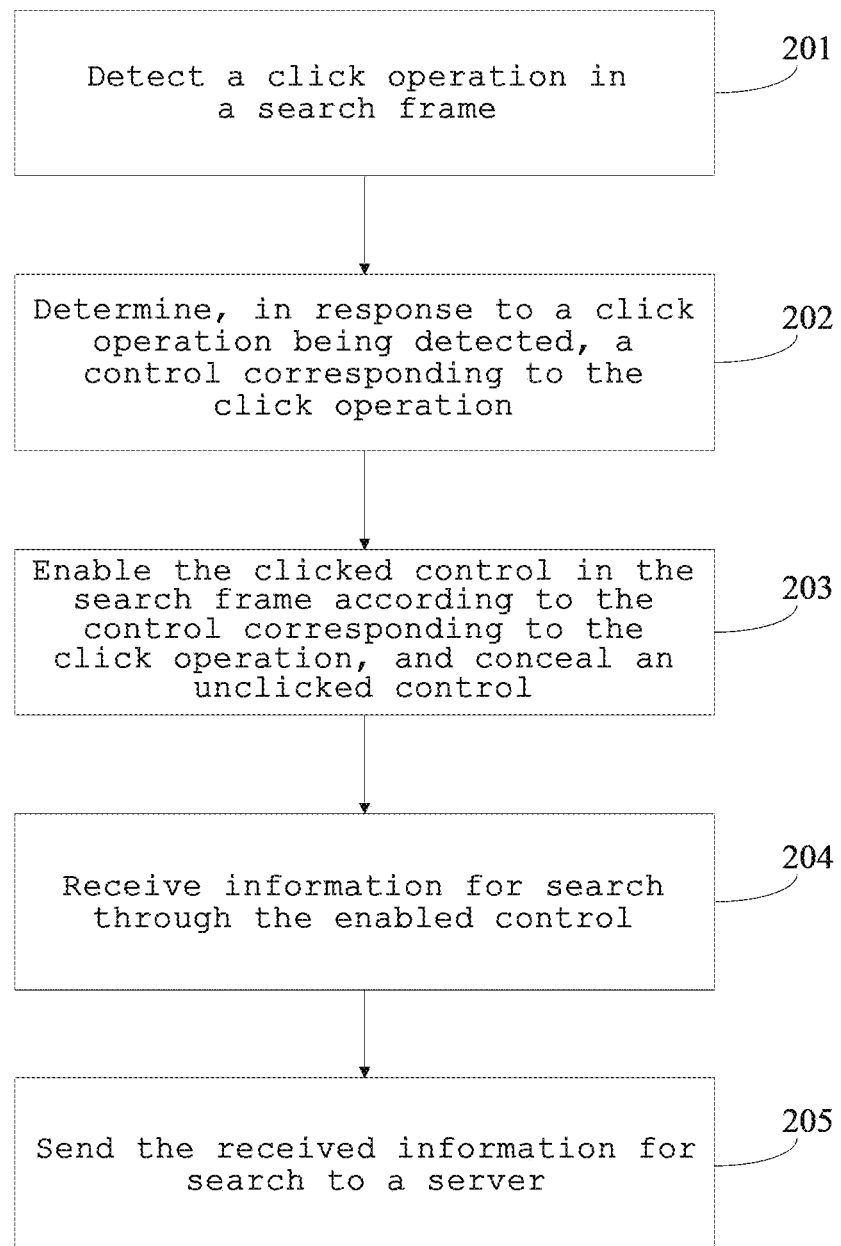
FIG. 2 is a flowchart of an embodiment of a search method according to the present application.

Continue to refer to FIG. 2, which shows a procedure 200 of an embodiment of a search method according to the present application. It should be noted that, the search method provided in this embodiment of the present application is generally performed by the terminal 101, and correspondingly, a search apparatus is generally disposed in the terminal 101. The search method includes the following steps:

Step 201, a click operation in a search frame is detected.

In this embodiment, an electronic device (such as the terminal shown in FIG. 1) on which the search method runs may detect a click operation of a user in a search frame of the terminal.

In this embodiment, the search frame may be a search frame provided in a search application, or may be a search frame provided in a browser application.

Step 202, in response to a click operation being detected, a control corresponding to the click operation is determined.

In this embodiment, the electronic device (such as the terminal shown in FIG. 1) may determine, in response to a click operation being detected, a control corresponding to the click operation. Here, the control includes a text input control and an image input control, where the text input control is used for receiving a text for search, and the image input control is used for receiving image for search.

In some alternative implementations of this embodiment, states of the control include a pre-enabled state, an enabled state, and a disabled state. The control in the pre-enabled state can be clicked, and the control in the enabled state can receive information input by a user. The control in the disabled state cannot accept a click or information input operation of a user. Before a click of a user, the control is in the pre-enabled state.

Figure 3A:
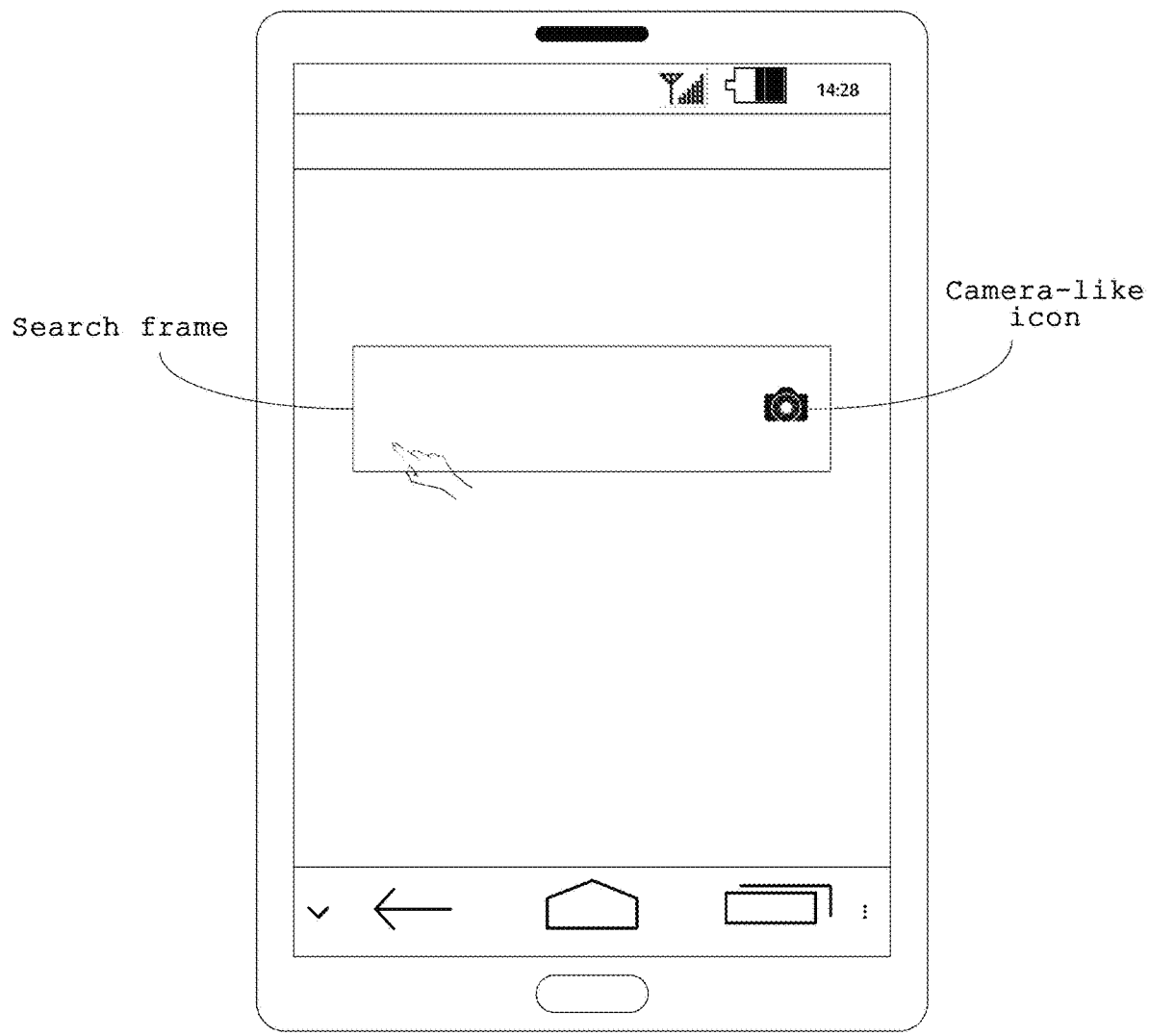
FIG. 3a is a schematic diagram of an application scenario of the search method according to the present application.

In some alternative implementations of this embodiment, if a blank part of the rectangular search frame shown in FIG. 3a is clicked, it can be determined that the control corresponding to the click operation is the text input control.

In some alternative implementations of this embodiment, if a camera-like icon shown in FIG. 3a is clicked, it can be determined that the control corresponding to the click operation is the image input control.

In some alternative implementations of this embodiment, the control may further include a speech input control, where the speech input control is used for receiving a speech input by a user. The text input control in the present application may be replaced with the speech input control, to execute the search method. The image input control in the present application may be replaced with the speech input control, to execute the search method.

Step 203, the clicked control in the search frame is enabled according to the control corresponding to the click operation, and an unclicked control is concealed.

In this embodiment, the electronic device (such as the terminal shown in FIG. 1) may enable the clicked control in the search frame according to the control corresponding to the click operation determined in Step 202, and conceal an unclicked control.

In some alternative implementations of this embodiment, enabling the control refers to switching the control from the pre-enabled state to the enabled state, and concealing the control refers to switching the control from the pre-enabled state to the disabled state.

In some alternative implementations of this embodiment, in response to the control corresponding to the click operation being the text input control, the text input control is enabled and the image input control is concealed.

Figure 3B:
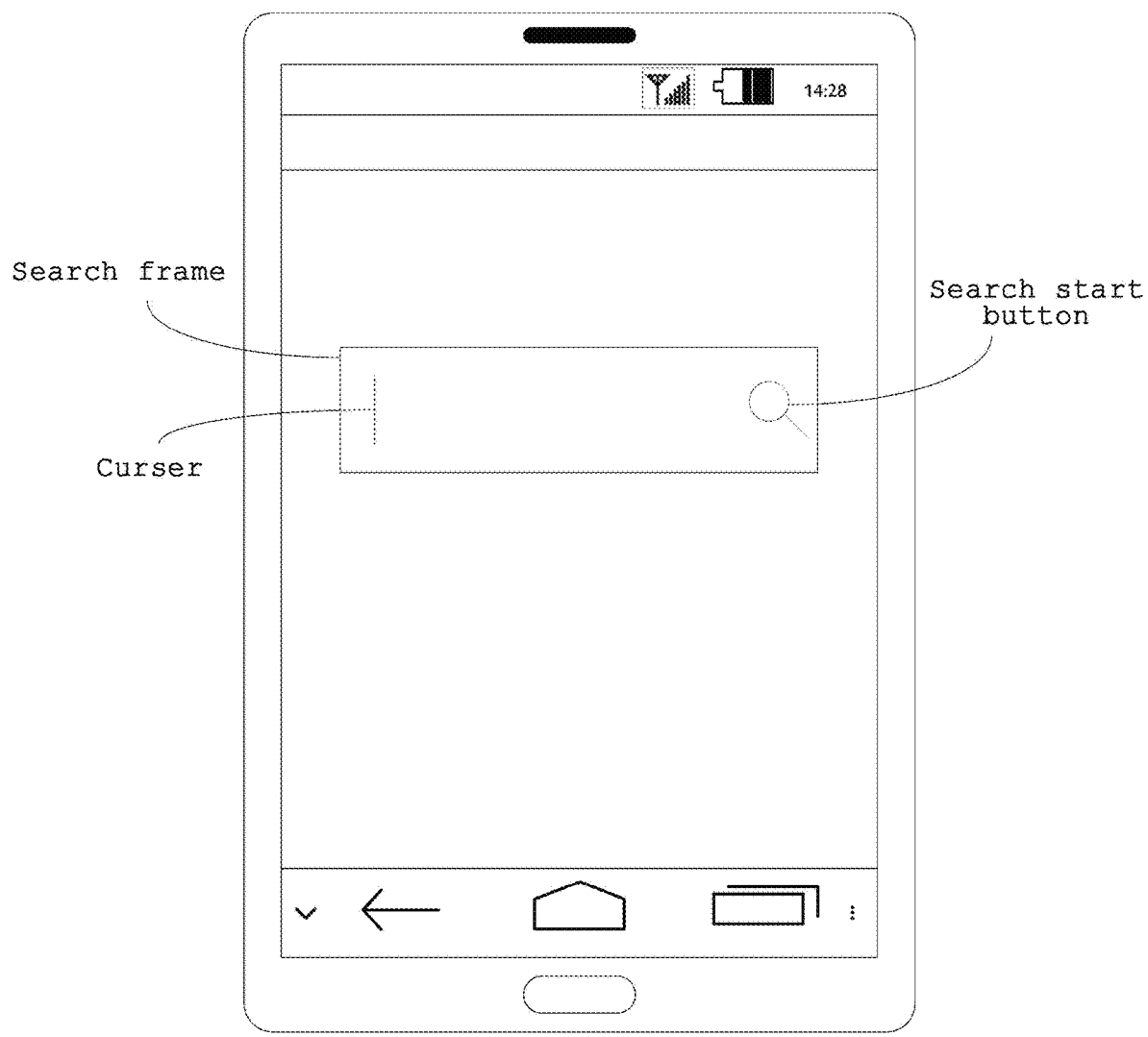
FIG. 3b is a schematic diagram of another application scenario of the search method according to the present application.

In some alternative implementations of this embodiment, the text input control is enabled, and as shown in FIG. 3b, a cursor may appear in the search frame, to prompt the user that a text can be input; moreover, the camera-like icon may be deleted, to prompt the user that images cannot be input at this time. A search start button of a search start control is set for the search frame, and the search start control is used for sending received information to the server according to a click of the user.

In some alternative implementations of this embodiment, in response to the control corresponding to the click operation being the image input control, the image input control is enabled and the text input control is concealed.

Figure 3C:
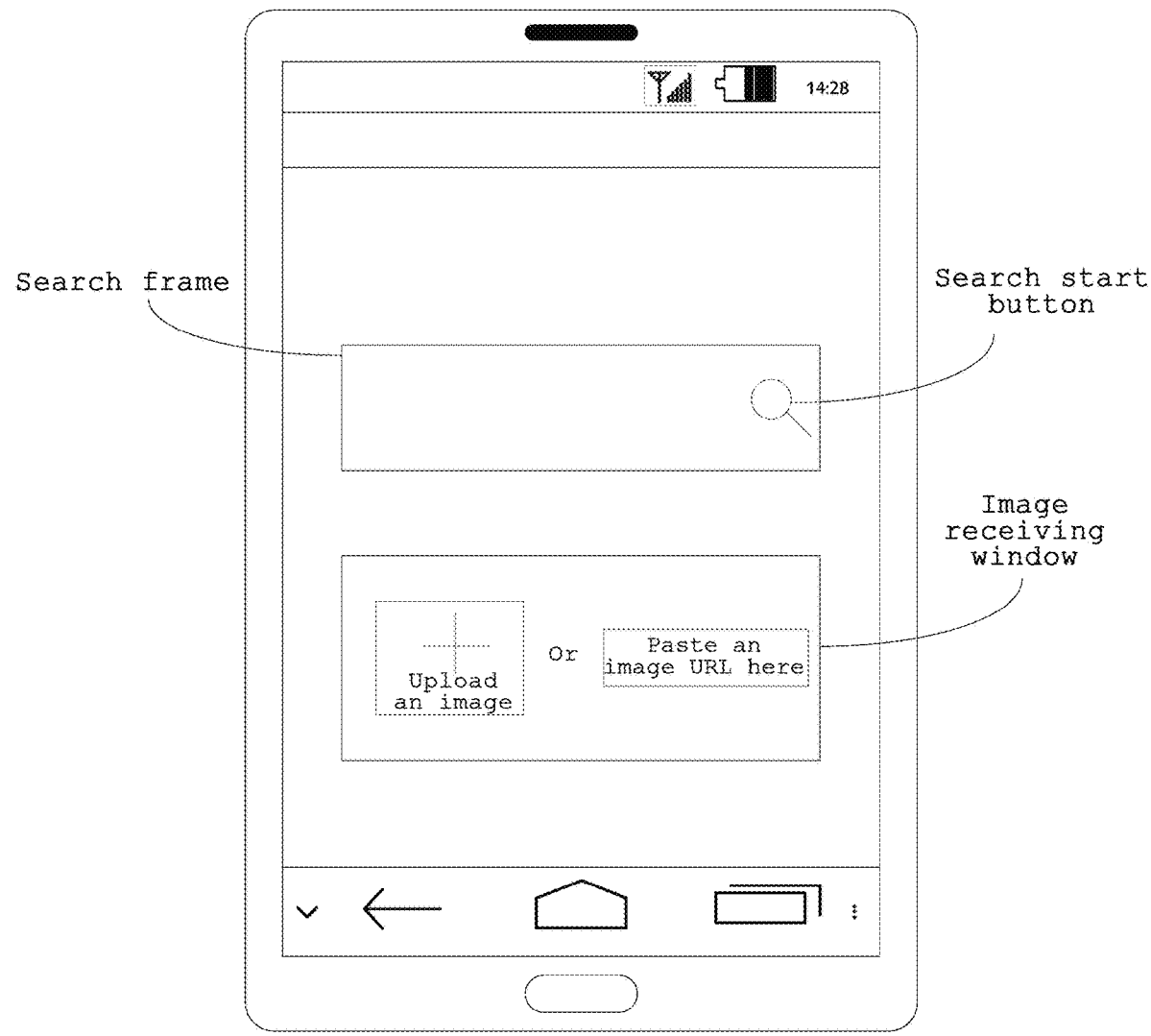
FIG. 3c is a schematic diagram of still another application scenario of the search method according to the present application.

In some alternative implementations of this embodiment, the image input control is enabled, and as shown in FIG. 3c, no cursor appears in the search frame, or the search frame is changed to be gray, to prompt the user that texts cannot be input at this time; moreover, an image receiving window may be further displayed, for the user to upload an image. In some implementations, an image may be uploaded using a local upload frame marked with words "upload an image", or an image may be uploaded using a URL paste frame marked with words "paste a URL here". A search start control is set for the search frame, and the search start control is used for sending received information to the server according to a click of the user.

Step 204, information for search is received through the enabled control.

In this embodiment, the electronic device (such as the terminal shown in FIG. 1) on which the search method runs may receive, through the control enabled in Step 203, information for search input by the user. Here, if the control enabled in Step 203 is the text input control, a text for search may be received by using the text input control; if the control enabled in Step 203 is the image input control, an image for search may be received by using the image input control.

In some alternative implementations of this embodiment, in response to the enabled control being the text input control, it is determined whether the received information for search is a text; and if no, first alarm information is sent. As an example, when the user attempts to upload an image in the search frame, words "only text can be input here" are displayed in the search frame as the first alarm information.

In some alternative implementations of this embodiment, in response to the enabled control being the text input control, a text input in the search frame may be cleared and a region outside the search frame may be clicked, to restore the search frame to a state that space is not selected.

In some alternative implementations of this embodiment, in response to the enabled control being the image input control, it is determined whether the received information for search is an image; and if no, second alarm information is sent. As an example, when the user attempts to input a text in the search frame, words "text is not supported, please input an image" may be displayed in the search frame as the second alarm information.

In some alternative implementations of this embodiment, in response to the enabled control is the image input control, an image receiving window may be closed and a region outside the search frame may be clicked, to restore the search frame to a state that space is not selected.

Step 205, the received information for search is sent to a server, so that the server carries out searching according to the information for search, to obtain an image search result.

In this embodiment, the electronic device (such as the terminal shown in FIG. 1) on which the search method runs may send the received information for search to a server, so that the server carries out searching according to the information for search, to obtain an image search result.

In some alternative implementations of this embodiment, after the user inputs information for search, in response to a click operation of the user on the search start control, the received information for search may be sent to the server.

In some alternative implementations of this embodiment, the electronic device may further receive the image search result sent by the server, and present the received image search result.

In some alternative implementations of this embodiment, that the server carries out searching according to the information for search to obtain an image search result may be implemented in the following manner: in response to the received search information being a text for search, matching the text for search with text characteristics of image information in a prestored image information set, where the image information in the image information set includes images, text characteristics corresponding to the images, and pictorial image characteristics corresponding to the images; determining a predetermined number of text characteristics matching the text for search; and sending an image, corresponding to the text characteristics obtained through matching, to the terminal as the image search result.

In some alternative implementations of this embodiment, that the server carries out searching according to the information for search to obtain an image search result may be implemented in the following manner: in response to the received search information being an image for search, matching the image for search with pictorial image characteristics of image information in a preset image information set, where the image information in the image information set includes images, text characteristics corresponding to the images, and pictorial image characteristics corresponding to the images; determining a predetermined number of pictorial image characteristics corresponding to the image for search; and sending an image, corresponding to the pictorial image characteristics obtained through matching, to the terminal as the image search result.

By specifying information for search to be a text or an image, the search method provided in foregoing embodiment of the present application can reduce operations for cross matching of two different pieces of information for search, shorten an operation time, and improve search efficiency.

Figure 4:
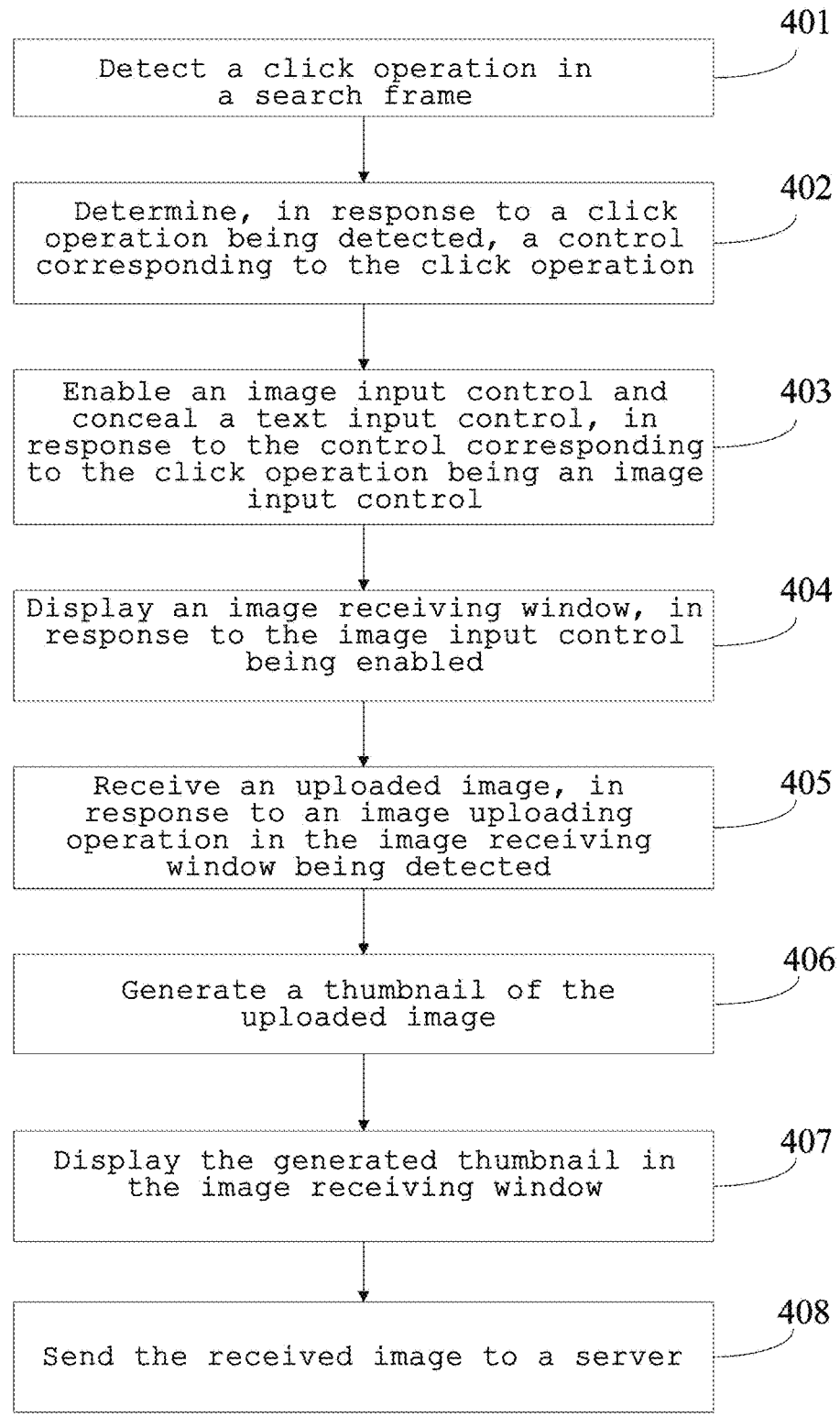
FIG. 4 is a flowchart of another embodiment of a search method according to the present application.

Further refer to FIG. 4, which shows a procedure 400 of another embodiment of the search method. The procedure 400 of the search method includes the following steps:

Step 401, a click operation in a search frame is detected.

In this embodiment, an electronic device (such as the terminal shown in FIG. 1) on which the search method runs may detect a click operation of a user in a search frame of the terminal.

Step 402, in response to a click operation being detected, a control corresponding to the click operation is determined.

In this embodiment, the electronic device (such as the terminal shown in FIG. 1) may determine, in response to a click operation being detected, a control corresponding to the click operation. Here, the control includes a text input control and an image input control, where the text input control is used for receiving a text for search, and the image input control is used for receiving image for search.

Step 403, in response to the control corresponding to the click operation being the image input control, the image input control is enabled and the text input control is concealed.

In this embodiment, according to the control corresponding to the click operation as determined in Step 402 being the image input control, the electronic device (such as the terminal shown in FIG. 1) may switch the image input control from a pre-enabled state to an enabled state, and conceal the text input control, that is, switch the text input control from a pre-enabled state to a disabled state.

Step 404, an image receiving window is displayed in response to the image input control being enabled.

In this embodiment, in response to the image input control being enabled, the electronic device displays an image receiving window in an interface in which the user carries out searching.

Step 405, an uploaded image is received in response to an image uploading operation in the image receiving window being detected.

In this embodiment, the electronic device receives an uploaded image, in response to an image uploading operation in the image receiving window being detected.

In some alternative implementations of this embodiment, the image uploading operation may include directly pasting an image in the image receiving window.

In some alternative implementations of this embodiment, the image uploading operation may include pasting a URL of an image in the image receiving window; the electronic device may acquire the image for search according to the URL.

In some alternative implementations of this embodiment, the image uploading operation may include pasting a local path in the image receiving window; the electronic device may acquire the image for search according to the local path.

In some alternative implementations of this embodiment, a screenshot search control may be provided in a user search interface. The user clicks a button of the screenshot search control to perform a screenshot operation, a screenshot obtained in the screenshot operation is used as the image for search, and the image uploading operation may include the screenshot acquisition process of the electronic device.

Step 406, a thumbnail of the uploaded image is generated.

In this embodiment, after receiving the uploaded image, the electronic device may generate a thumbnail of the uploaded image. It can be appreciated by those skilled in the art that, the technique of generating a thumbnail of an image from the image is well known by those skilled in the art, and details are not described herein.

Step 407, the generated thumbnail is displayed in the image receiving window.

In this embodiment, the electronic device may display, in the image receiving window, the thumbnail generated in Step 406.

Step 408, the received image is sent to a server, so that the server carries out searching according to the information for search, to obtain an image search result.

In this embodiment, the electronic device may send the received information for search to a server, so that the server carries out searching according to the information for search, to obtain an image search result.

It can be seen from FIG. 4 that, compared with the embodiment corresponding to FIG. 2, the procedure 400 of the search method in this embodiment emphasizes the step of extending a keyword. Therefore, the solution described in this embodiment can introduce more keyword related data, thus implementing more comprehensive selection of candidate push information and more effective searching.

Figure 5:
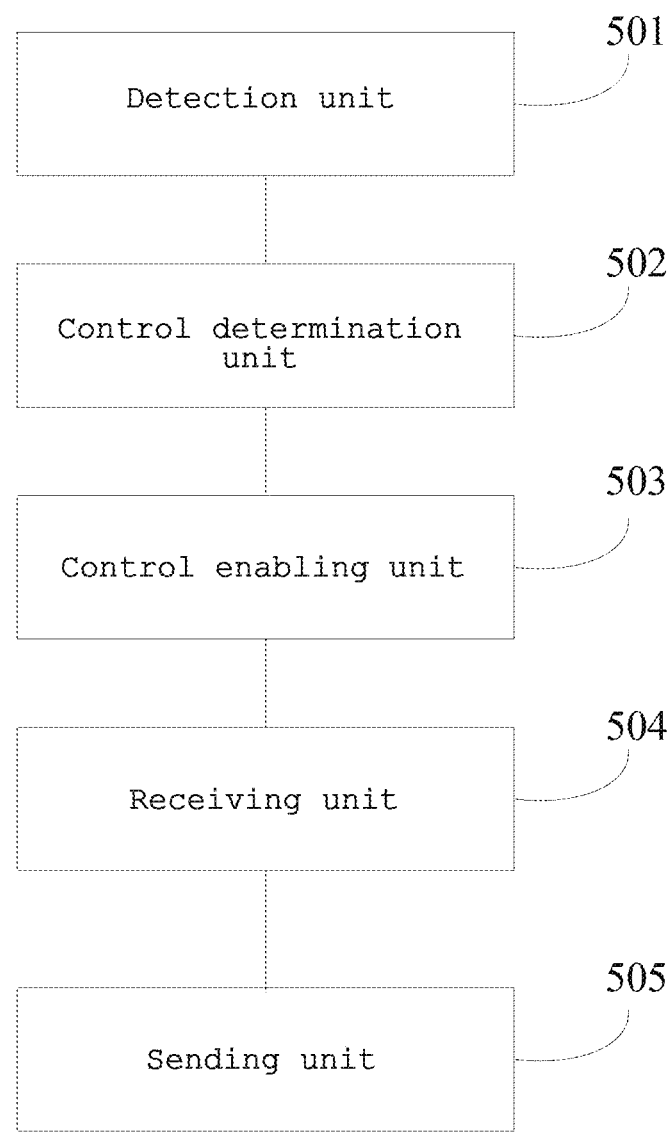
FIG. 5 is a schematic structural diagram of an embodiment of a search apparatus according to the present application.

Further referring to FIG. 5, as an implementation of the methods shown in the above figures, the present application provides an embodiment of a search apparatus. This apparatus embodiment corresponds to the method embodiment shown in FIG. 2, and the apparatus may be specifically applied to various electronic devices.

As shown in FIG. 5, the search apparatus 500 in this embodiment includes: a detection unit 501, a control determination unit 502, a control enabling unit 503, a receiving unit 504, and a sending unit 505. The detection unit 501 is configured to detect a click operation in a search frame; the control determination unit 502 is configured to determine, in response to a click operation being detected, a control corresponding to the click operation, where the control includes a text input control and an image input control that are preset in the search frame, the text input control is used for receiving a text for search, and the image input control is used for receiving an image for search; the control enabling unit 503 is configured to enable the clicked control in the search frame according to the control corresponding to the click operation, and conceal an unclicked control; the receiving unit 504 is configured to receive information for search through the enabled control, where the information for search includes a text for search or an image for search; and the sending unit 505 is configured to send the received information for search to a server, so that the server carries out searching according to the information for search, to obtain an image search result.

In this embodiment, the receiving unit 501 of the search apparatus 500 may detect a click operation of a user in a search frame of a terminal.

In this embodiment, the control determination unit 502 may determine, in response to a click operation being detected, a control corresponding to the click operation. Here, the control includes a text input control and an image input control, where the text input control is sued for receiving a text for search, and the image input control is used for receiving an image for search.

In this embodiment, according to the control corresponding to the click operation determined by the control determination unit 502, the control enabling unit 503 may enable the clicked control in the search frame and conceal an unclicked control.

In this embodiment, the receiving unit 504 may receive, through the control enabled by the control enabling unit 503, the information for search input by the user. Here, if the control enabled by the control enabling unit 503 is the text input control, a text for search may be received by using the text input control; if the control enabled by the control enabling unit 503 is the image input control, an image for search may be received by using the image input control.

In this embodiment, the sending unit 505 may send the received information for search to a server, so that the server carries out searching according to the information for search, to obtain an image search result.

In some alternative implementations of this embodiment, the enabling unit is further configured to: enable the text input control and conceal the image input control, in response to the control corresponding to the click operation being the text input control; and enable the image input control and conceal the text input control, in response to the control corresponding to the click operation being the image input control.

In some alternative implementations of this embodiment, the receiving unit is further configured to: determine whether the received information for search is a text, in response to the enabled control being the text input control; and if no, send first alarm information; and determine whether the received information for search is an image, in response to the enabled control being the image input control; and if no, send second alarm information.

In some alternative implementations of this embodiment, the enabling unit is further configured to: display an image receiving window, in response to the image input control being enabled; receive an uploaded image, in response to an image uploading operation in the receiving window being detected; generate a thumbnail of the uploaded image; and display the generated thumbnail in the image receiving window.

Figure 6:
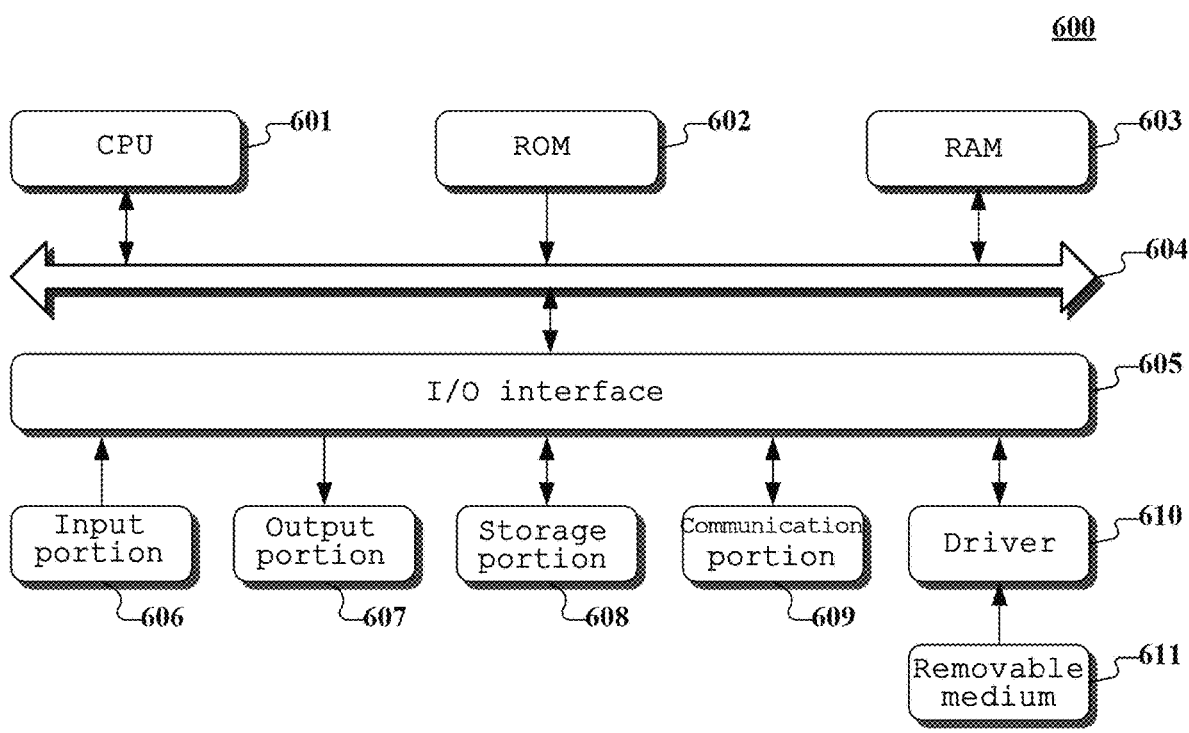
FIG. 6 is a schematic structural diagram of a computer system suitable for implementing a terminal or a server according to an embodiment of the present application.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a detection unit, a control determination unit, a control enabling unit, a receiving unit and a sending unit, where the names of these units or modules are not considered as a limitation to the units or modules. For example, the blocking unit may also be described as "a unit for detecting a click operation in a search frame."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: detect a click operation in a search frame; determine, in response to a click operation being detected, a control corresponding to the click operation, wherein the control comprises a text input control and an image input control that are preset in the search frame, the text input control is used for receiving a text for search, and the image input control is used for receiving an image for search; enable a clicked control in the search frame according to the control corresponding to the click operation, and concealing an unclicked control; receive information for search through the enabled control, wherein the information for search comprises a text for search or an image for search; and send the received information for search to a server, so that the server carries out searching according to the information for search, to obtain an image search result.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A search system, comprising: a terminal and a server, wherein
    the terminal detects a click operation in a search frame, the search frame being preset with a text input control and an image input control; determines, in response to the click operation being detected, a control corresponding to the click operation from the text input control and the image input control, wherein the text input control is used for receiving text for search, and the image input control is used for receiving an image for search; enable a clicked control in the search frame according to the control corresponding to the click operation, and conceal an unclicked control in the search frame; receive information for search through the enabled control, wherein the information for search comprises text for search or an image for search; and send the received information for search to the server, so that the server carries out searching according to the information for search, to obtain an image search result; and
    the server receives the information for search sent by the terminal, and carry out searching according to the received information for search, to obtain the image search result;
    wherein the terminal further:
        determines whether the received information for search is text, in response to the enabled control being the text input control; and send, in response to the received information for search being not the text, first alarm information; and
        determines whether the received information for search is an image, in response to the enabled control being the image input control; and send, in response to the received information for search being not the image, second alarm information;
        enables the text input control and conceal the image input control, in response to the control corresponding to the click operation being the text input control; and
        enables the image input control and conceal the text input control, in response to the control corresponding to the click operation being the image input control.

2. The system according to claim 1, wherein the terminal further:
    displays an image receiving window, in response to the image input control being enabled;
    receives an uploaded image, in response to an image uploading operation in the image receiving window being detected;
    generates a thumbnail of the uploaded image; and
    displays the generated thumbnail in the image receiving window.

3. The system according to claim 1, wherein the server further:
    matches, in response to the received search information being text for search, the text for search with text characteristics of image information in a prestored image information set, wherein the image information in the image information set comprises images, text characteristics corresponding to the images, and pictorial image characteristics corresponding to the images;
    determines a predetermined number of text characteristics matching the text for search; and
    sends an image, corresponding to the text characteristics obtained through matching, to the terminal as the image search result.

4. The system according to claim 3, wherein the server further:
    matches, in response to the received search information being an image for search, the image for search with the pictorial image characteristics of image information in a preset image information set, wherein the image information in the image information set comprises images, text characteristics corresponding to the images, and pictorial image characteristics corresponding to the images;

determines a predetermined number of pictorial image characteristics corresponding to the image for search; and sends an image, corresponding to the pictorial image characteristics obtained through matching, to the terminal as the image search result.

5. A search method, comprising:

detecting a click operation in a search frame, the search frame being preset with a text input control and an image input control;

determining, in response to the click operation being detected, a control corresponding to the click operation from the text input control and the image input control, wherein the text input control is used for receiving text for search, and the image input control is used for receiving an image for search;

enabling a clicked control in the search frame according to the control corresponding to the click operation, and concealing an unclicked control in the search frame;

receiving information for search through the enabled control, wherein the information for search comprises text for search or an image for search; and sending the received information for search to a server, so that the server carries out searching according to the information for search, to obtain an image search result;

wherein the receiving information for search through the enabled control comprises:

determining whether the received information for search is text, in response to the enabled control being the text input control; and sending, in response to the received information for search being not the text, first alarm information; and determining whether the received information for search is an image, in response to the enabled control being the image input control; and sending, in response to the received information for search being not the image, second alarm information;

wherein the enabling the clicked control in the search frame according to the control corresponding to the click operation, and concealing an unclicked control comprises:

enabling the text input control and concealing the image input control, in response to the control corresponding to the click operation being the text input control; and enabling the image input control and concealing the text input control, in response to the control corresponding to the click operation being the image input control.

6. The method according to claim 5, wherein the enabling the image input control and concealing the text input control comprises:

displaying an image receiving window, in response to the image input control being enabled;

receiving an uploaded image, in response to an image uploading operation in the image receiving window being detected;

generating a thumbnail of the uploaded image; and displaying the generated thumbnail in the image receiving window.

7. A search apparatus, comprising:

at least one processor; and a memory storing instructions, which when executed by the at least one processor, cause the at least one processor to perform operations, the operations comprising:

detecting a click operation in a search frame, the search frame being preset with a text input control and an image input control;

determining, in response to the click operation being detected, a control corresponding to the click operation from the text input control and the image input control, wherein the text input control is used for receiving text for search, and the image input control is used for receiving an image for search;

enabling the clicked control in the search frame according to the control corresponding to the click operation, and concealing an unclicked control in the search frame;

receiving information for search through the enabled control, wherein the information for search comprises a text for search or an image for search; and sending the received information for search to a server, so that the server carries out searching according to the information for search, to obtain an image search result;

wherein the receiving information for search through the enabled control comprises:

determining whether the received information for search is a text, in response to the enabled control being the text input control; and sending, in response to the received information for search being not the text, first alarm information; and determining whether the received information for search is an image, in response to the enabled control being the image input control; and sending, in response to the received information for search being not the image, second alarm information;

wherein the enabling the clicked control in the search frame according to the control corresponding to the click operation, and concealing an unclicked control comprises:

enabling the text input control and concealing the image input control, in response to the control corresponding to the click operation being the text input control; and enabling the image input control and concealing the text input control, in response to the control corresponding to the click operation being the image input control.

8. The apparatus according to claim 7, wherein the enabling the clicked control in the search frame according to the control corresponding to the click operation, and concealing an unclicked control comprises:

displaying an image receiving window, in response to the image input control being enabled;

receiving an uploaded image, in response to an image uploading operation in the image receiving window being detected;

generating a thumbnail of the uploaded image; and displaying the generated thumbnail in the image receiving window.

9. A non-transitory computer storage medium storing a computer program, which when executed by one or more processors, cause the one or more processors to perform operations, the operations comprising:

detecting a click operation in a search frame, the search frame being preset with a text input control and an image input control;

determining, in response to the click operation being detected, a control corresponding to the click operation from the text input control and the image input control, wherein the text input control is used for receiving a text for search, and the image input control is used for receiving an image for search;

enabling a clicked control in the search frame according to the control corresponding to the click operation, and concealing an unclicked control in the search frame;

receiving information for search through the enabled control, wherein the information for search comprises text for search or an image for search; and sending the received information for search to a server, so that the server carries out searching according to the information for search, to obtain an image search result;

wherein the receiving information for search through the enabled control comprises:
  determining whether the received information for search is text, in response to the enabled control being the text input control; and sending, in response to the received information for search being not the text, first alarm information; and
  determining whether the received information for search is an image, in response to the enabled control being the image input control; and sending, in response to the received information for search being not the image, second alarm information;

wherein the enabling the clicked control in the search frame according to the control corresponding to the click operation, and concealing an unclicked control comprises:
  enabling the text input control and concealing the image input control, in response to the control corresponding to the click operation being the text input control; and
  enabling the image input control and concealing the text input control, in response to the control corresponding to the click operation being the image input control.

10. The non-transitory computer storage medium according to claim 9, wherein the enabling the image input control and concealing the text input control comprises:
  displaying an image receiving window, in response to the image input control being enabled;
  receiving an uploaded image, in response to an image uploading operation in the image receiving window being detected;
  generating a thumbnail of the uploaded image; and
  displaying the generated thumbnail in the image receiving window.

* * * * *